(12) United States Patent
Miyashita et al.

(10) Patent No.: US 8,146,900 B2
(45) Date of Patent: Apr. 3, 2012

(54) POSITIONING AND CLAMPING APPARATUS

(75) Inventors: Yukihiro Miyashita, Tokyo (JP); Satoshi Miyazaki, Tokyo (JP)

(73) Assignee: Koganei Corporation, Tokyo (JP)

( * ) Notice: Subject to any disclaimer, the term of this patent is extended or adjusted under 35 U.S.C. 154(b) by 1051 days.

(21) Appl. No.: 12/050,268

(22) Filed: Mar. 18, 2008

(65) Prior Publication Data

US 2008/0229559 A1    Sep. 25, 2008

(30) Foreign Application Priority Data

Mar. 20, 2007   (JP) .................................. 2007-73236

(51) Int. Cl.
*B23Q 3/08* (2006.01)

(52) U.S. Cl. ............... 269/32; 269/228; 269/24; 269/28

(58) Field of Classification Search .............. 269/32, 269/228, 24, 27, 20, 95, 28, 91
See application file for complete search history.

(56) References Cited

U.S. PATENT DOCUMENTS

| | | | | |
|---|---|---|---|---|
| 7,017,895 B2 * | 3/2006 | Sakamoto | ...................... | 269/32 |
| 7,029,000 B2 * | 4/2006 | Petit et al. | ...................... | 269/47 |
| 7,448,607 B2 * | 11/2008 | Steele et al. | ...................... | 269/32 |
| 7,516,948 B2 * | 4/2009 | McIntosh et al. | ............... | 269/32 |
| 7,584,946 B2 * | 9/2009 | Doi | ................................. | 269/32 |
| 7,815,176 B2 * | 10/2010 | McIntosh et al. | ............... | 269/32 |
| 2008/0229559 A1 * | 9/2008 | Miyashita et al. | ............. | 24/528 |

FOREIGN PATENT DOCUMENTS

| | | |
|---|---|---|
| JP | 9144715 A | 6/1997 |
| JP | 2000176874 | 6/2000 |
| JP | 2002187026 A | 7/2002 |
| JP | 2003159617 A | 6/2003 |
| JP | 2003165037 A | 6/2003 |
| JP | 2003260626 | 9/2003 |
| JP | 2006263885 A | 10/2006 |

OTHER PUBLICATIONS

Corresponding Japanese Office Action dated Oct. 19, 2010 with English abstract attached.

* cited by examiner

*Primary Examiner* — Lee D Wilson
(74) *Attorney, Agent, or Firm* — McCormick, Paulding & Huber LLP

(57) ABSTRACT

A positioning and clamping apparatus, capable of positioning and clamping a panel material and removing the panel material from a locating pin under a state of releasing the clamping, is provided. A base having a contact surface contacting with the panel material is provided with the locating pin that penetrates through a through-hole of the panel material. A clamp arm moving between an escaping position and a clamping position is provided in a slit, and the clamp arm is moved between these positions by a reciprocating cam. When the clamp arm reaches the clamping position, the panel material is clamped by a clamp portion which is a tip of the clamp arm. A pusher driven by a pushing piston is provided inside the base, and the panel material is removed from the locating pin by the pusher.

6 Claims, 8 Drawing Sheets

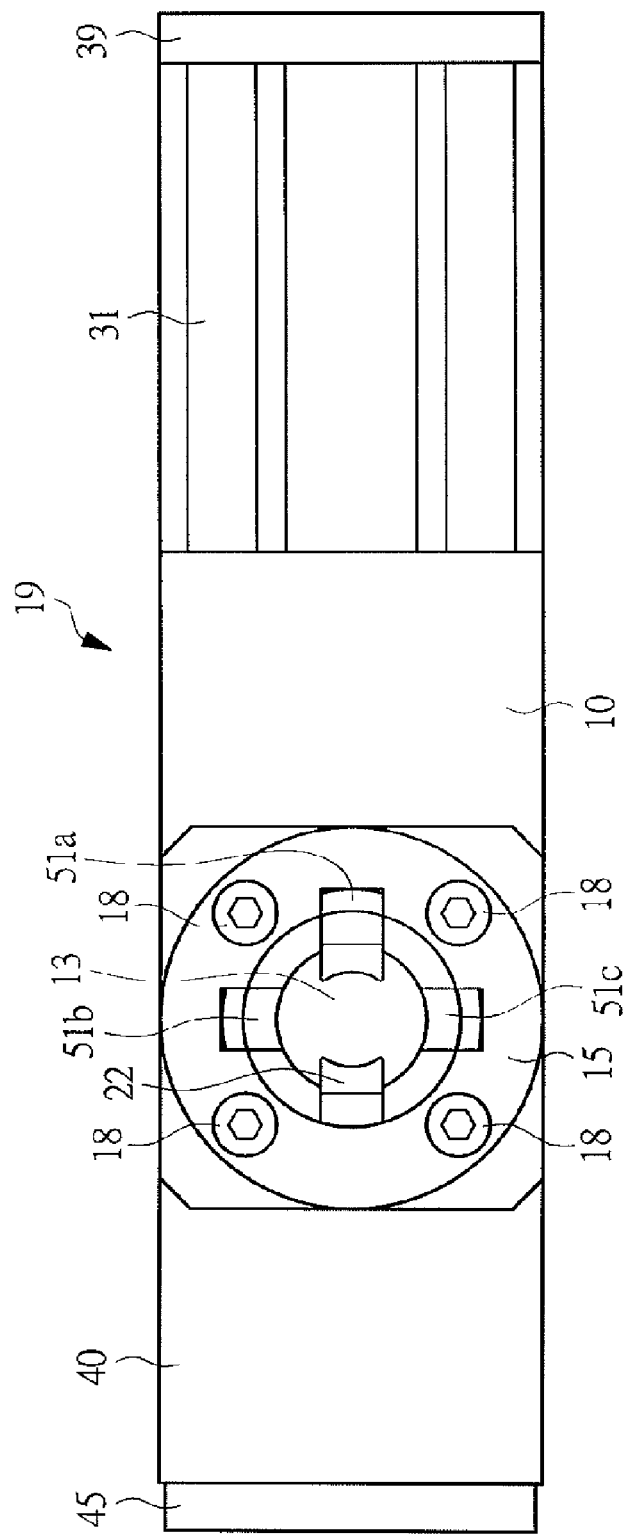

POSITIONING AND CLAMPING APPARATUS

CROSS-REFERENCE TO RELATED APPLICATIONS

Applicant hereby claims foreign priority benefits under U.S.C. §119 from Japanese Patent Application No. 2007-73236 filed on Mar. 20, 2007, the contents of which are incorporated by reference herein.

TECHNICAL FIELD OF THE INVENTION

The present invention relates to a positioning and clamping apparatus capable of positioning and clamping a panel material by a locating pin as well as removing the panel material from the locating pin.

BACKGROUND OF THE INVENTION

An automobile body is formed by joining a plurality of panel materials to each other by spot welding. In carrying out the spot welding, it is necessary to position and clamp various kinds of panel materials, which constitute the automobile body. Therefore, in order to position and clamp these panel materials, a plurality of positioning and clamping apparatuses are attached to a welding stage located in an automobile production line. Also, by mounting the positioning and clamping apparatus on a tip of a robot arm and operating and moving the robot arm, the positioning and clamping apparatus positions and clamps the panel materials. Further, on a carrier truck for carrying the panel materials, a plurality of positioning and clamping apparatuses are mounted for clamping the panel materials.

In any cases, the conventional positioning and clamping apparatus has the locating pin which is fitted to a positioning hole formed in the panel material that is a workpiece. By fitting the locating pin to the positioning hole, the panel material is positioned. Furthermore, in order to clamp the panel material, a clamp arm is incorporated into a slit formed in the locating pin so that the clamp arm can come out from the slit in clamping the panel material. This type of positioning and clamping apparatus is disclosed in, for example, Japanese Patent Application Laid-Open Publication No. 2000-176874 (Patent Document 1) and Japanese Patent Application Laid-Open Publication No. 2003-260626 (Patent Document 2).

SUMMARY OF THE INVENTION

In such a conventional positioning and clamping apparatus, the spot welding is carried out while the clamp arm positions and clamps the panel material. After completion of a welding operation, the panel material is removed from the locating pin while the clamp arm is released. In order to remove the panel material, a panel removing apparatus is disposed adjacently to the positioning and clamping apparatus. However, if the panel removing apparatus and the positioning and clamping apparatus are provided to the welding stage or the tip of the robot arm, areas occupied by these apparatuses are increased.

An object of the present invention is to provide a positioning and clamping apparatus capable of positioning and clamping a panel material and removing the panel material from a locating pin while the clamping is released.

A positioning and clamping apparatus according to the present invention comprises: a locating pin provided on a base having a contact surface contacting with a panel material, and protruding from the contact surface to penetrate through a through-hole formed in the panel material; a clamp arm provided in a slit formed in the locating pin, and moving between an escaping position of entering into the slit and a clamping position where a clamp portion comes out from the slit and clamps the panel material along with the contact surface; a reciprocating cam having a cam hole formed so as to contact with a drive pin fixed to a distal portion of the clamp arm, and moving, between the escaping position and the clamping position, the clamp arm via the drive pin; a cam member fixed to the base so as to penetrate through an oscillating groove formed in the clamp arm, and causing the clamp arm to enter into the slit when the clamp arm reaches the escaping position and causing the clamp portion to come out from the slit when the clamp arm reaches the clamping position; a pusher reciprocally incorporated into the base along the locating pin between a removal position of protruding from the contact surface to remove the panel material from the locating pin and a retreat limit position of entering into the contact surface; cam drive means for driving the reciprocating cam between the escaping position and the clamping position; and pusher driving means for driving the pusher between the removal position and the retreat limit position.

In the positioning and clamping apparatus according to the present invention, the pusher driving means comprises: a pushing cylinder provided in the base; and a pushing piston reciprocally mounted in the pushing cylinder and linked to the reciprocating cam, fluid supplied to a pressure chamber partitioned and formed by the pushing cylinder and the pushing piston causing the pusher to he driven up to the removal position via the pushing piston.

The positioning and clamping apparatus according to the present invention further comprises: a spring member causing the pusher to come out at a waiting position located between the removal position and the escaping position; and a position detecting sensor for detecting a position of the pushing piston, wherein the position detecting sensor detects that the panel material contacts with the contact surface and that the pusher moves backward from the waiting position.

The positioning and clamping apparatus according to the present invention is such that the cam driving means comprises: a clamp cylinder provided to the base; and a clamp piston reciprocally mounted in the clamp cylinder and driving the reciprocating cam, fluid supplied to the pressure chamber partitioned and formed by the clamp cylinder and the clamp piston causing the clamp arm to be driven up to the clamping position via the reciprocating cam.

In the positioning and clamping apparatus according to the present invention, the cam driving means comprises: an escaping cylinder provided to the base; and an escaping piston reciprocally mounted in the escaping cylinder and driving the clamp arm up to the escaping position via the reciprocating cam.

In the positioning and clamping apparatus according to the present invention, the cam driving means comprises a spring member mounted in a spring chamber provided to the base to drive the clamp arm up to the escaping position via the reciprocating cam.

According to the present invention, the panel material is positioned at a predetermined position by the locating pin penetrating through the through-hole formed in the panel material, and is clamped in a state of being positioned by the clamp arm provided to the locating pin. Under a state of being clamped in this manner, a welding operation and the like can be performed to the panel material. After the welding operation to the panel material is completed, the clamping of the panel material by the clamp arm is released, and then the panel material is automatically removed from the locating pin by operating the pusher. Thus, the panel material which is a workpiece can be simply conveyed from the positioning and clamping apparatus.

Since the pusher is provided to the base together with the clamp arm, it becomes unnecessary that any apparatus for removing the panel material from the positioning and clamping apparatus is disposed around the positioning and clamping apparatus. Therefore, the panel material after the completion of the operation can be removed by a downsized apparatus.

Since a position of the pushing piston for driving the pusher is detected by the position detecting sensor, a state where the panel material is removed by the pusher can be detected. Therefore, it becomes unnecessary to provide the position detecting sensor near the clamp arm or near movement locus of the panel material.

BRIEF DESCRIPTION OF THE DRAWINGS

FIG. 3 is a top plan view of FIG. 1;

DESCRIPTION OF THE PREFERRED EMBODIMENTS

Figure 1:
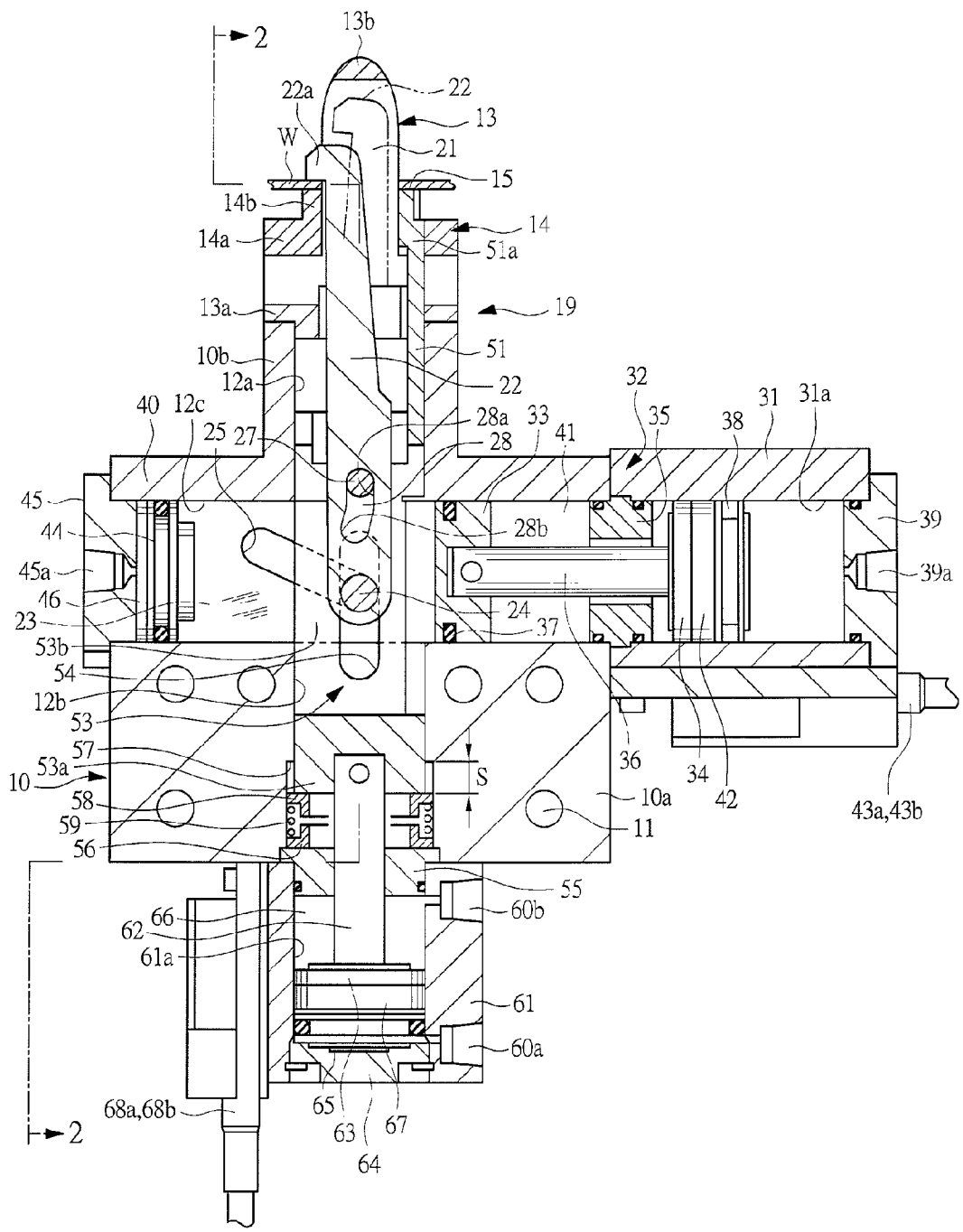
FIG. 1 is a sectional view showing a positioning and clamping apparatus according to one embodiment of the present invention.
Figure 2:
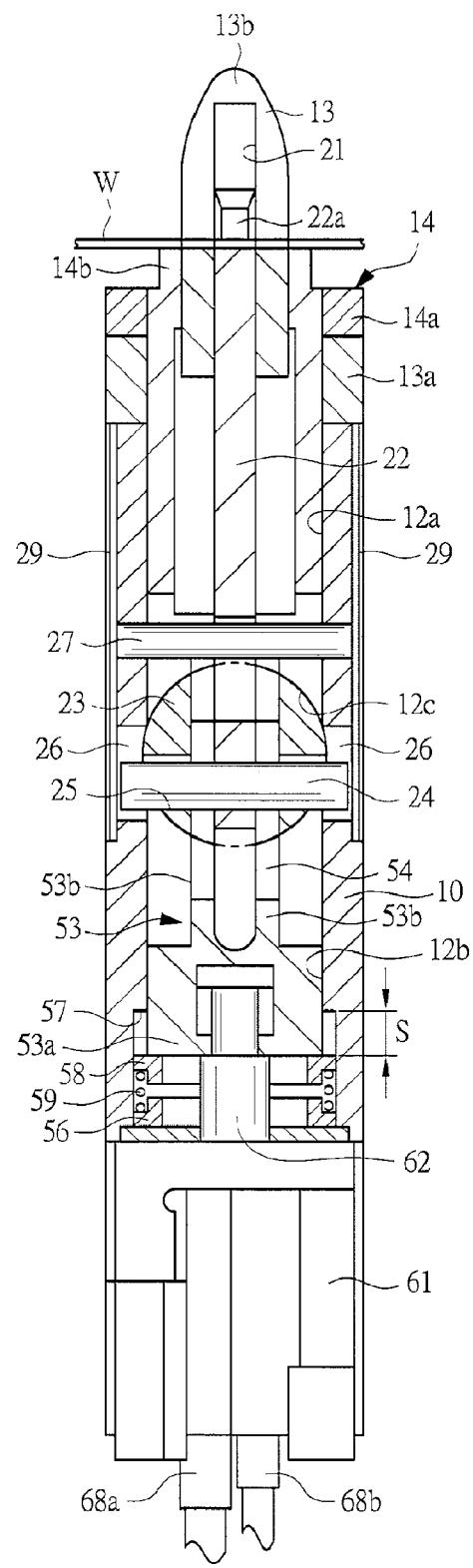
FIG. 2 is a sectional view taken along line 2-2 in FIG. 1.

An embodiment of the present invention will be described below in detail with reference to the drawings. FIG. 1 is a sectional view showing a positioning and clamping apparatus according to one embodiment of the present invention; and FIG. 2 is a sectional view taken along line 2-2 in FIG. 1; and FIG. 3 is a top plan view of FIG. 1.

A positioning and clamping apparatus is disposed on, for example, a welding stage in an automobile production line, and is used for positioning and clamping various kinds of panel materials constituting an automobile body. This positioning and clamping apparatus has a base block 10 made of metal, and the base block 10 includes a rectangular-shaped main body portion 10a and a cylindrical portion 10b formed integrally with the main body portion 10a, wherein the base body 10 is attached to the welding stage by screw members mounted on a plurality of attaching holes 11 formed in the main body portion 10a.

An outer circumferential surface of the cylindrical portion 10b is approximately quadrangular, and a circular receiving hole 12a is formed in the cylindrical portion 10b. A locating pin 13 is attached to a tip of the cylindrical portion 10b, and a distal portion side of the locating pin 13 is provided integrally with a flange portion 13a. The locating pin 13 is fixed to the cylindrical portion 10b by a work-receiving ring 14 that contacts with the flange portion 13a. The work-receiving ring 14 comprises a large diameter portion 14a on its distal side and a small diameter portion 14b that is provided integrally therewith and located on a tip side of the work-receiving ring. A tip surface of the small diameter portion 14b serves as a contact surface 15 with which the panel material contacts. Incidentally, the work-receiving ring 14 may be formed into such a ring shape that its outer diameter has wholly the same dimension as that of the large diameter portion 14a and that its outer circumferential surface becomes straight axially.

Figure 4A:
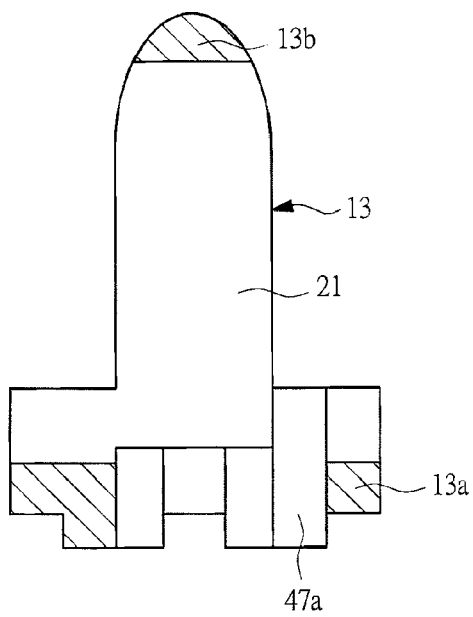
FIG. 4A is a sectional view of a locating pin.
Figure 4B:
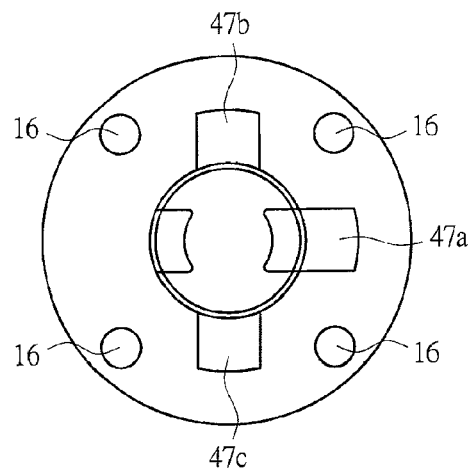
FIG. 4B is a top plan view of FIG. 4A.
Figure 4C:
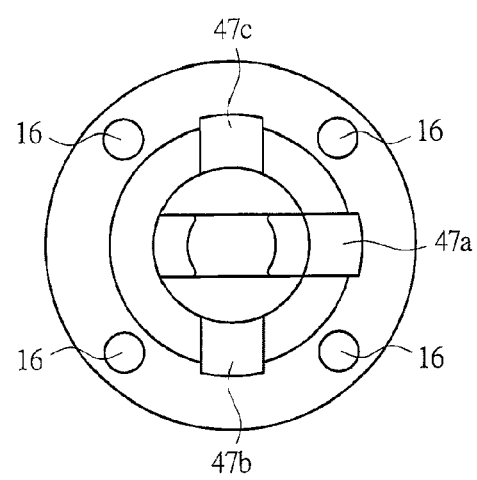
FIG. 4C is a bottom view of FIG. 4A.
Figure 5A:
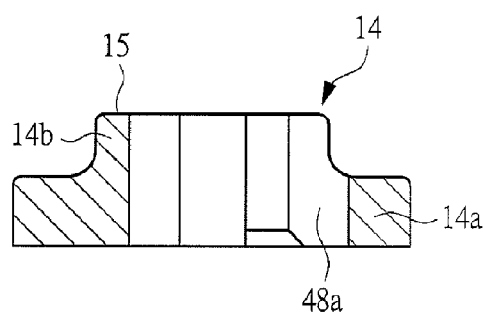
FIG. 5A is a sectional view of a work-receiving ring.
Figure 5B:
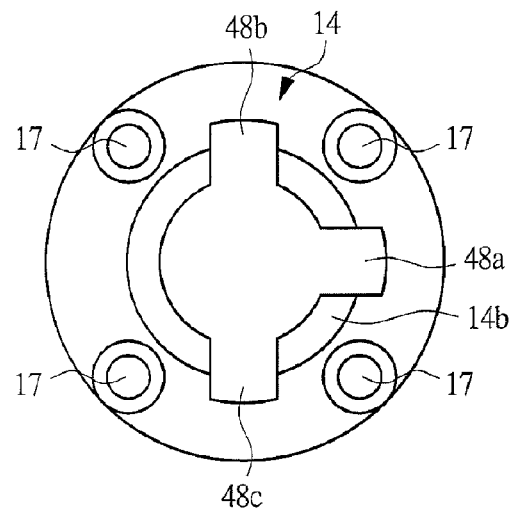
FIG. 5B is a top plan view of FIG. 5A.

FIG. 4A is a sectional view of the locating pin 13; FIG. 4B is a top plan view of FIG. 4A; and FIG. 4C is a bottom view of FIG. 4A. FIG. 5A is a sectional view of the work-receiving ring 14; and FIG. 5B is a top plan view of FIG. 5A.

Four through-holes 16 are formed in the flange portion 13a of the locating pin 13, and four spot-facing-equipped through-holes 17 are formed in the work-receiving ring 14 so as to correspond to the through-holes 16, respectively. As shown in FIG. 3, the locating pin 13 and the work-receiving ring 14 are fixed to the cylindrical portion 10b by bolts 18 which are screwed through each of the through-holes 16 and 17 into screw holes (not shown) formed in the cylindrical portion 10b. The base block 10 and the work-receiving ring 14 constitute a base 19, and the locating pin 13 protrudes outward from the contact surface 15 of the base 19. Therefore, as shown in FIG. 1, when the locating pin 13 is caused to penetrate through a through-hole formed in the panel material W, the panel material W is positioned at a predetermined position of the welding stage.

As shown in FIG. 4, a slit 21 is formed in the locating pin 13 by leaving its tip portion 13b, and the slit 21 extends up to a distal surface of the flange portion 13a and simultaneously penetrates through the locating pin 13 in its radial direction. As shown in FIG. 1, a clamp arm 22 is incorporated into the slit 21. A receiving hole 12b coaxial with the receiving hole 12a formed in the cylindrical portion 10b is formed in the main body portion 10a of the base block 10, and simultaneously a receiving hole 12c, which is substantially perpendicular to both of the receiving holes 12a and 12b and penetrates through those receiving holes 12a and 12b to extend laterally, is formed in the main body portion 10a.

A reciprocating cam 23 is reciprocably mounted into the receiving hole 12c so as to cross the receiving holes 12a and 12b, and a cam hole 25, which contacts with a drive pin 24 fixed to a distal portion of the clamp arm 22, is formed in the reciprocating cam 23 so as to incline toward a reciprocating direction of the reciprocating cam 23. FIG. 1 shows a state in which the reciprocating cam 23 is at one end position of a reciprocating stroke. At this time, the drive pin 24 contacts with a position where it is separate from the locating pin 13 in the cam hole 25, so that the clamp arm 22 reaches a retreat limit position where it is drawn inside the base block 10 via the drive pin 24 by the reciprocating cam 23. Meanwhile, when the reciprocating cam 23 is moved to the other end position of the reciprocating stroke, since the drive pin 24 contacts with a locating-pin side of the cam hole 25, the clamp arm 22 reaches a forward limit position. Thus, when the drive pin 24 reciprocates in an axial direction of the locating pin 13, long holes 26 which guide both end portions of the drive pin 24 and into which respective end portions of the drive pin 26 enter are formed, as shown in FIG. 2, in the base block 10.

A cam member 27 is fixed to the base block 10 so as to cross the receiving hole 12a, and this cam member 27 penetrates through an oscillating groove 28 formed in the clamp arm 22. This oscillating groove 28 includes: a lengthwise-directional portion 28a extending in a longitudinal direction of the clamp arm 22 from the tip side of the clamp arm 22 toward the distal portion thereof; and an escaping portion 28b continuing and inclining to this lengthwise-directional portion 28a. For this reason, as shown in FIG. 1, when the reciprocating cam 23 reaches the one end position of the reciprocating stroke, the clamp arm 22 is at the retreat limit position by the reciprocating cam 23 and a tip side of the oscillating groove 28 reaches a position of the cam member 27. Therefore, a clamp portion 22a provided to the tip of the clamp arm 22 comes out from the slit 21 and is at a position where the panel material W is clamped between the contact surface 15 and the clamp portion 22a. Meanwhile, when the reciprocating cam 23 moves from the position of FIG. 1 in a right direction and moves up to the other end position of the reciprocating stroke, the clamp arm 22 is driven to the forward limit position by the reciprocating cam 23 via the drive pin 24 and simultaneously the escaping portion 28b of the oscillating groove 28 reaches a position of the cam member 27. Therefore, as shown by a double-dot line in FIG. 1, the clamp arm 22 is at an escaping position where it enters into the slit 21. Both end surfaces of the cam member 27 and the drive pin 24 are covered, as shown in FIG. 2, with a cover plate 29 attached to the base block 10.

Thus, when the reciprocating cam 23 is caused to reciprocate in the receiving hole 12c, the clamp arm 22 moves forward and backward toward its tip portion in the slit by the drive pin 24, and simultaneously the clamp arm 22 guided into the oscillating groove 28 along the cam member 27 fixed to the base block 10 oscillates. Therefore, the clamp arm 22 moves between the escaping position where it enters into the slit 21 and a clamping position where the clamp portion 22a comes out from the slit 21 to clamp the panel material W between the contact surface 15 and the clamp portion 22a.

The base block 10 is provided with a cylinder 31 in which a receiving hole 31a coaxial with the receiving hole 12c is formed, and the base block 10 and the cylinder 31 constitute a clamp cylinder 32. A primary piston 33 is axially reciprocally mounted inside the receiving hole 12c, and a secondary piston 34 is axially reciprocally mounted inside the receiving hole 31a. Both of the primary and secondary pistons 33 and 34 are linked by a linking rod 36 which penetrates through a partition wall 35 attached between both the receiving holes 12c and 31a. While an annular groove formed in an outer circumference of the primary piston 33 is provided with an O-ring 37 as a sealing material, an annular groove 38 formed in the secondary piston 34 is not provided with an O-ring, and a space, which is partitioned and formed by the clamp cylinder 32 between a head cover 39 fixed to an outer end portion of the cylinder 31 and the primary piston 33, serves as a pressure chamber 41. Fluid is intended to be supplied to the pressure chamber 41 from the outside via a supply/exhaust port 39a provided in the head cover 39. When the fluid is supplied to the supply/exhaust port 39a, the fluid flows in the pressure chamber 41 via a gap located between the secondary piston 34 and the receiving hole 31a, and a thrust force in a direction of driving the reciprocating cam 23 toward the clamping position is applied to the primary piston 33. Accordingly, the fluid supplied into the pressure chamber 41 causes the clamp arm 22 to be driven up to the clamping position via the reciprocating cam 23.

As shown in FIG. 1, the primary piston 33 is provided with the O-ring 37, and the primary piston 33 forms the pressure chamber 41 between this O-ring and the head cover 39, whereby the primary piston 33 constitutes a clamp piston for driving the clamp arm 22 up to the clamping position.

A magnet 42 is mounted in another annular groove formed adjacently to the annular groove 38 in the secondary piston 34, and two position detecting sensors 43a and 43b, which are sensitive to a magnetic force of the magnet 42, are attached outside the cylinder 31 so as to correspond to the clamping position and the escaping position of the reciprocating cam 23, respectively. Accordingly, when the primary piston 33 moves up to the clamping position as shown in FIG. 1, the secondary piston 34 synchronizing with the primary piston 33 is also at the clamping position, so that the position detecting sensor 43a is sensitive to the magnetic force of the magnet 42, thereby detecting that the primary piston 33 has been at the clamping position. Meanwhile, when the reciprocating cam 23 reaches the escaping position, the position detecting sensor 43b is sensitive to the magnetic force of the magnet 42, thereby detecting that the primary piston 33 has been at the escaping position.

An escaping piston 44 is reciprocally mounted in the receiving hole 12c of the base block 10 so as to oppose to the primary piston 33 via the reciprocating cam 23, and a portion of base block 10 receiving the escaping piston 44 constitutes an escaping cylinder 40. A space between the head cover 45 fixed to the base block 10 so as to oppose to the escaping piston 44 and the escaping piston 44 serves as an escaping pressure chamber 46. Fluid is supplied to the pressure chamber 46 from the outside via a supply/exhaust port 45a provided in the head cover 45. When the fluid is supplied to the supply/exhaust portion 45a, the fluid flows in the pressure chamber 46, whereby a thrust force for driving the reciprocating cam 23 in a direction reverse to a driving direction by the primary piston 33 is applied to the escaping piston 44. Accordingly, the fluid supplied into the pressure chamber 46 causes the clamp arm 22 to be driven up to the escaping position via the reciprocating cam 23.

In the case shown in FIG. 1, although the primary piston 33 becomes a clamp piston for driving the clamp arm 22 up to the clamping position via the reciprocating cam 23, when the O-ring 37 mounted in the primary piston 33 is mounted as a sealing material such as an O-ring in the annular groove 38 formed in the secondary piston 34, the pressure chamber 41 is formed between the secondary piston 34 and the head cover 39, whereby the secondary piston 34 becomes the clamp piston. Thus, since the two pistons 33 and 34 are linked by the linking rod 36, any of the pistons can be set to the clamp piston. Therefore, according to status of use of the positioning and clamping apparatus, any of the pistons can be selected. In a type in which the secondary piston 34 serves as the clamp piston, if the linking rod 36 is directly linked to the reciprocating cam 23, and a retreat pressure chamber is formed between the secondary piston 34 and the partition wall 35, the reciprocating cam 23 can be driven up to the escaping position by supplying the fluid to the pressure chamber formed between the secondary piston 34 and the head cover 39.

Thus, cam driving means for driving, between the escaping position and the clamping position, the reciprocating cam 23 is constituted by the primary piston 33 as the clamp pistons and the escaping piston 44.

In the case shown in FIG. 1, although the reciprocating cam 23 and the clamp arm 22 are driven up to the escaping position by supplying the fluid into the pressure chamber 46, a compressed coil spring may be mounted in the pressure chamber 46 as a spring chamber and the clamp arm 22 may be driven up to the escaping position by the compressed coil spring.

As shown in FIG. 4, three guide grooves 47a to 47c are formed in the flange portion 13a of the locating pin 13 so as to be arranged radially outward relative to the locating pin 13. The guide groove 47a is formed on a side opposite to a position where the clamp portion 22a of the clamp arm 22 comes out, and the other two guide grooves 47b and 47c are formed at positions where they are displaced an angle of 90° in a circumference direction so as to be centered about the guide groove 47a. As shown in FIG. 5, guide grooves 48a to 48c are formed in the large diameter portion 14a of the work-receiving ring 14 so as to correspond to the guide grooves 47a to 47c, respectively.

Figure 6A:
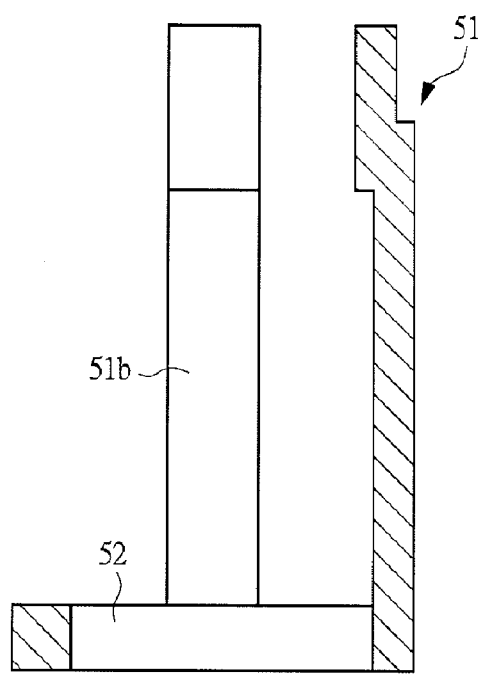
FIG. 6A is a sectional view showing a pusher.

A pusher 51 is incorporated axially reciprocally into the receiving hole 12a. FIG. 6A is a sectional view showing the pusher 51; and FIG. 6B is a top plan view of FIG. 6A.

The pusher 51 has three pushing bar members 51a to 1c so as to surround the locating pin 13. Each of the pushing bar members 51a to 51c is provided integrally with an annular distal portion 52, and protrudes from the distal portion 52 toward a tip portion thereof. The pushing bar member 51a enters into the guide grooves 47a and 48a formed in the flange portion 13a of the locating pin 13 and the large diameter portion 14a of the work-receiving ring 14, the pushing bar member 51b enters into the guide grooves 47b and 48b, and the pushing bar member 51c enters into the guide grooves 47c and 48c. Therefore, when the pusher 51 is reciprocated, each of the pushing bar members 51a to 51c moves along the locating pin 13. FIG. 1 shows a state where the pusher 51 is at the retreat limit position. At this time, each of the pushing bar members 51a to 51c enters into the base 19. Meanwhile, when the pusher 51 reaches the forward limit position, each of the pushing bar members 51a to 51c protrudes from the contact surface 15 and is at a removal position. When the pusher 51 is driven up to this removal position, the panel material W is pushed out up to the tip portion of the locating pin 13 by the pushing bar members 51a to 51c.

Figure 6B:
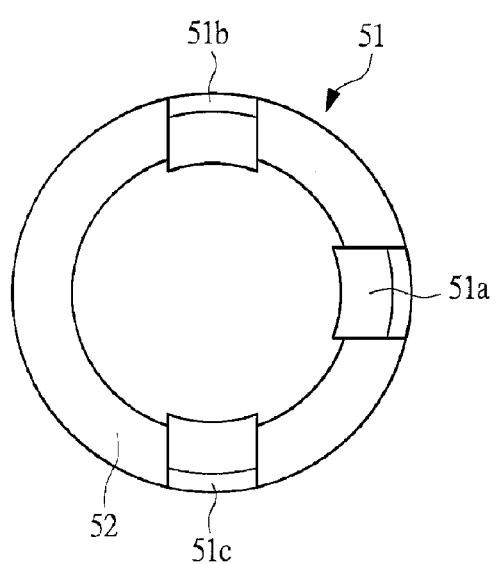
FIG. 6B is a top plan view of FIG. 6A.

Although the panel material W is pushed out up to the tip portion of the locating pin 13 by the pusher 51, if a movement stroke of the pusher 51 is set longer than the case as shown in FIGS. 6A to 6C, the panel material W may be pushed out even up to a front of the locating pin 13 by the pusher 51.

A drive member 53 for driving the pusher 51 between the escaping position and the removal position is reciprocally incorporated into the receiving hole 12b. The drive member 53 has a base portion 53a, wherein an outer circumferential surface of the base portion 53a contacts with the inner circumferential surface of the receiving hole 12b to guide reciprocating movement. The base portion 53a is provided integrally with two linking plate portions 53b, and a tip of each of the linking plate portions 53b is linked to the pusher 51. As shown in FIG. 2, each of the linking plate portions 53b is arranged on both sides of the clamp arm 22 so as to overlap with each other and penetrates through a slit formed in the reciprocating cam 23, and a long hole 54 for avoiding interfering with the drive pin 24 and the cam member 27 is formed in each of the linking plate portions 53b.

A rod cover 55 is fixed to the base block 10 so as to cover the receiving hole 12b. Between a spring bearing 56 contacting with an inner surface of this rod cover 55 and a spring bearing 58 contacting with a step portion 57 formed in the receiving hole 12b, a compressed coil spring 59 is mounted as a spring member. By a spring force of this compressed coil spring 59, the pusher 51 reaches a waiting position where the pushing bar members 51a to 51c protrude from the contact surface 15. A stroke, in which the tip surfaces of the pushing bar members 51a to 51c protrude up to the waiting position from a position of the contact surface 15, corresponds to a stroke of the spring bearing 58 shown by the reference symbol "S" in FIG. 2. The pusher 51 is moved slightly backward from the position shown in FIG. 1.

When the panel material W is set to the locating pin 13 under a waiting state where each tip surface of the pushing bar members 51a to 51c protrudes only a stroke S from the contact surface 15, the pushing bar members 51a to 51c are pushed into by the panel material W and move backward from the waiting position up to a position where each the tip surfaces of the pushing bar members 51a to 51c coincide with the contact surface 15. Under this state, when the reciprocating cam 23 is driven up to the clamping position shown in FIG. 1 by the clamp piston, the panel material W is clamped by the clamp arm 22.

In order to remove the panel material W from the locating pin 13, the clamp arm 22 is driven up to the escaping position from the clamping position and then the pusher 51 is driven up to the forward limit position which is the removal position. To drive the pusher 51 up to the removal position, a pushing cylinder 61 having a receiving hole 61a coaxial with the receiving hole 12b is provided in the base block 10, and a pushing piston 63 linked to the pusher 51 via the drive member 53 by a piston rod 62 is reciprocally mounted inside the pushing cylinder 61. Between a head cover 64 fixed to an end portion of the pushing cylinder 61 and the pushing piston 63, a forward pressure chamber 65 is formed. When fluid is supplied to the pressure chamber 65 from a supply/exhaust port 60a which communicates with this chamber and is formed in the pushing cylinder 61, a thrust force in a direction of advancing the pusher 51 is applied to the pushing piston 63. Meanwhile, between the pushing piston 63 and the rod cover 55, a retreat pressure chamber 66 is formed. When fluid is supplied to the retreat pressure chamber 66 from a supply/exhaust port 60b which communicates with this chamber and is formed in the pushing cylinder 61, a thrust force in a direction of retreating forcibly the pushing piston 63 from the waiting position to the retreat limit position is applied. When the pushing piston 63 reaches the retreat limit position, the tip surfaces of the pushing bar members 51a to 51c are at the waiting position of being slightly retreated from the contact surface 15.

In this manner, there is constituted pusher drive means for driving the pusher 51 between the removal position and the retreat limit position by the pusher 63.

A magnet 67 is mounted in an annular groove formed in the pushing piston 63, and two position detecting sensors 68a and 68b, which are sensitive to a magnetic force of the magnet 67, are attached outside the pushing cylinder 61. By such a structure, as shown in FIG. 1, when each of the pushing bar members 51a to 51c becomes in a state of entering into the base 19, the position detecting sensor 68a is sensitive to the magnetic force of the magnet 67 and detects that the pushing piston 63 is moved backward up to the position shown in FIG. 1. When the pushing piston 63 reaches the removal position, the position detecting sensor 68b is sensitive to the magnetic force of the magnet 67 and detects that the pushing piston 63 is at the removal position.

Each of the position detecting sensors 68a and 68b detects whether the panel material W is in a state of being set to the contact surface 15 according to the position of the pushing piston 63 for driving the pusher 51 or whether it is in a state of being removed from the locating pin 13. Therefore, each of the pushing bar members 51a to 51c plays a role in a function of a sensor dog for operating the sensors, whereby it is unnecessary to provide these position detecting sensors 68a and 68b near the clamp arm 22 or inside the cylinder portion 10b of the base block 10.

Compressed air as fluid is intended to be supplied into each of the above-described pressure chambers, and a compressed-air supply source (not shown) is connected to each of the supply/exhaust ports via a piping. Also, since an electromagnetic valve provided in the piping is driven by a control signal from a controller (not shown), the clamp arm 22 is automatically driven to the clamping position and the escaping position. Signals from the respective magnetic sensors are inputted into the controller, so that the position of the clamp arm 22 is automatically detected and simultaneously it is automatically detected that the panel material W is positioned on the locating pin 13 and contacts with the contact surface 15. A plurality of positioning and clamping apparatuses are arranged on the welding stage for clamping the panel material W and performing a welding operation thereto, and the panel material W as a workpiece is positioned and clamped by the plurality of locating pins 13.

Figure 7A:
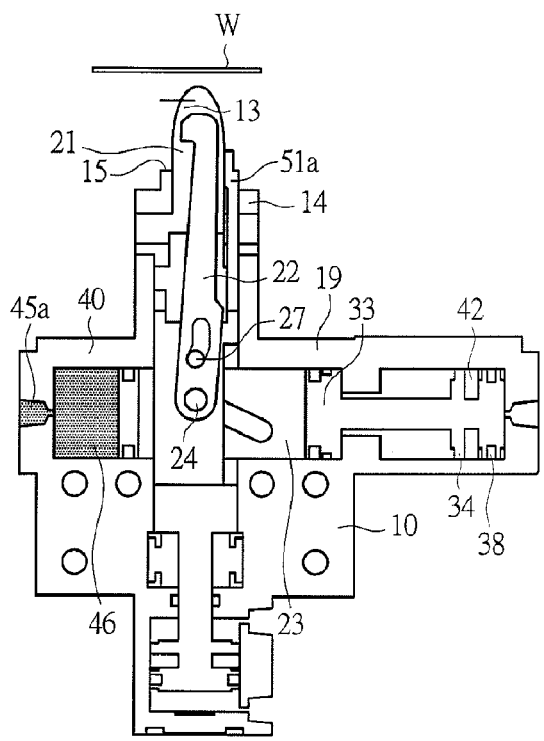
FIG. 7A is a schematic diagram showing an operation state of the positioning and clamping apparatus.
Figure 7B:
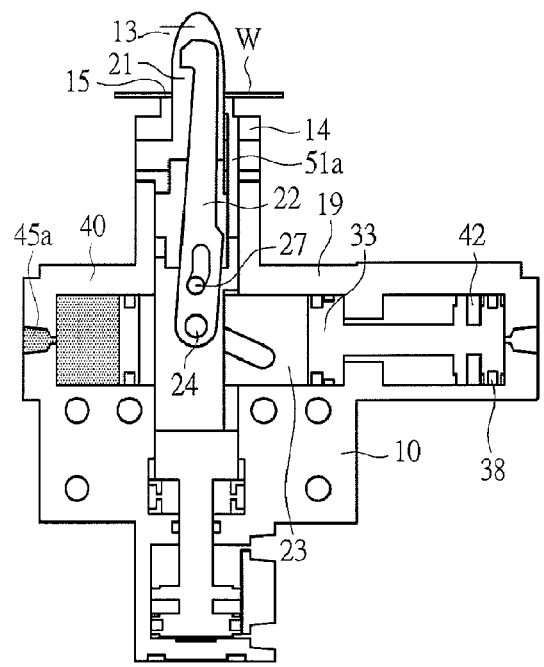
FIG. 7B is a schematic diagram showing an operation state of the positioning and clamping apparatus.
Figure 7C:
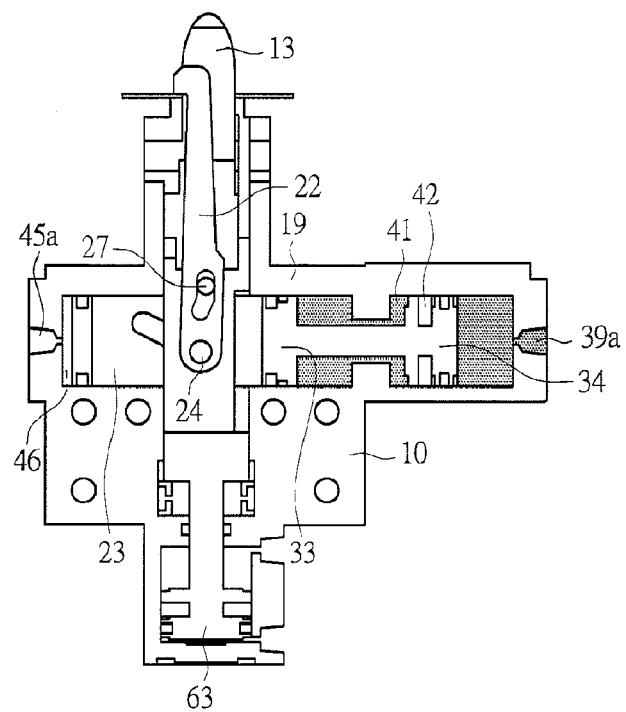
FIG. 7C is a schematic diagram showing an operation state of the positioning and clamping apparatus.
Figure 8A:
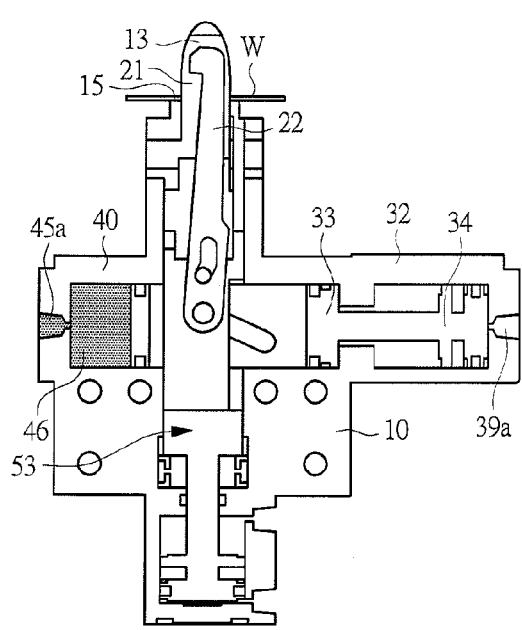
FIG. 8A is a schematic diagram showing the operation state of the positioning and clamping apparatus.
Figure 8B:
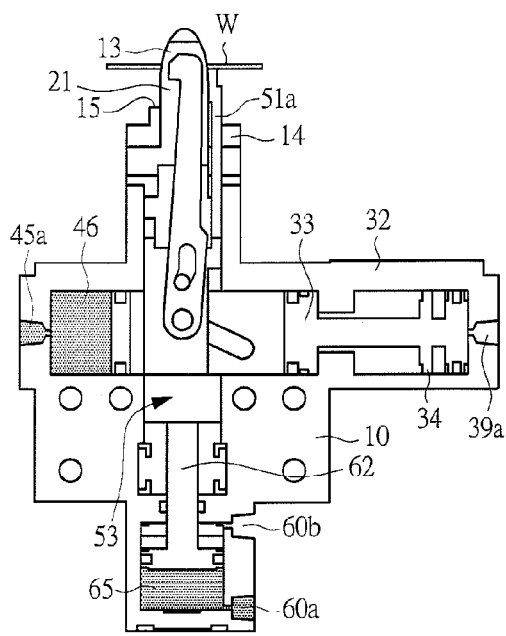
FIG. 8B is a schematic diagram showing the operation state of the positioning and clamping apparatus.
Figure 8C:
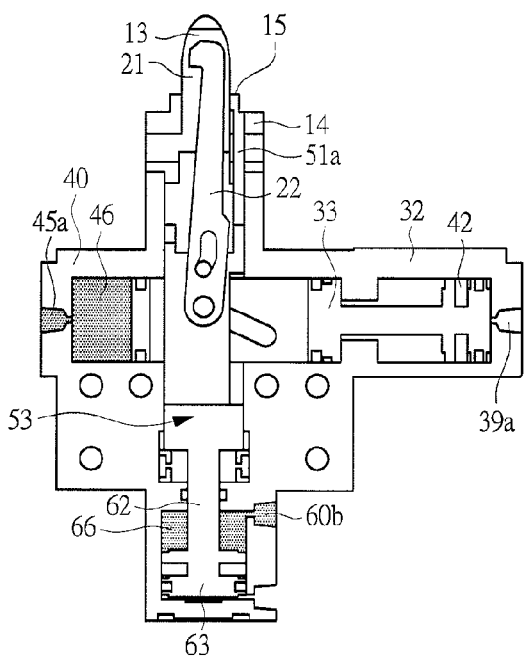
FIG. 8C is a schematic diagram showing the operation state of the positioning and clamping apparatus.

FIGS. 7 and 8 are schematic diagrams each showing an operating state of the positioning and clamping apparatus described above. FIG. 7A shows a waiting state of the positioning and clamping apparatus, wherein fluid is supplied to the pressure chamber 46 from the supply/exhaust port 45a in the waiting status which is a state before the panel material W as a workpiece is set. Accordingly, the escaping piston 44 drives the reciprocating cam 23 up to the escaping position, and the clamp arm 22 reaches the escaping position where it enters into the slit 21. At this time, a spring force of the compressed coil spring 59 causes the spring bearing 58 to contact with the step portion 57, so that the pusher 51 reaches the waiting position via the drive member 53 and that each of the tip surfaces of the pushing bar members 51a to 51c protrudes only a predetermined stroke S from the contact surface 15.

Under this state, as shown in FIG. 7B, the panel material W is set, the locating pin 13 penetrates through the through-hole of the panel material W, and the locating pin 13 causes the panel material W to be positioned at a predetermined position on the welding stage. When the panel material W contacts with the contact surface 15, a load of the panel material W causes the pusher 51 to be moved up to the retreat limit position, thereby moving the pushing piston 63 up to the retreat limit position via the drive member 53. When the pushing piston 63 moves up to the retreat limit position, the position detecting sensor 68a is sensitive to the magnetic force of the magnet 67, outputs a detection signal to the controller and automatically detects that the panel material W contacts with the contact surface 15 as well as is set to the locating pin 13.

Next, as shown in FIG. 7C, when the fluid is supplied into the pressure chamber 41 from the supply/exhaust port 39a, the primary piston 33 as a clamp piston moves the reciprocating cam 23 up to the clamping position by the pressure of the fluid supplied in the pressure chamber 41. Accordingly, the cam hole 25 of the reciprocating cam 23 slides along the drive pin 24, and the drive pin 24 moves backward in a direction of being separate from the locating pin 13, whereby the clamp arm 22 moves backward. This backward movement causes the oscillating groove 28 to slide along the cam member 27, and the clamp arm 22 reaches the clamping position where the clamp portion 22a comes out from the slit 21 to fasten the panel materials W between the contact surface 15 and the clamp portion 22a. Under this state, the welding operation to the panel material W is performed.

After the welding operation is completed, first, as shown in FIG. 8A, the fluid in the pressure chamber 41 is exhausted from the supply/exhaust portion 39a, and the fluid is supplied into the pressure chamber 46 from the supply/exhaust port 45a. By the fluid supplied into the pressure chamber 46, the thrust force is applied to the escaping piston 44, and the reciprocating cam 23 is driven up to the escaping position, whereby the primary piston 33 and the secondary piston 34 are also driven up to the escaping position. Accordingly, since the clamp arm 22 is driven up to the escaping position, the clamping of the panel material W by the clamp portion 22a is released.

Under this state, as shown in FIG. 8B, when the fluid is supplied to the pressure chamber 65 from the supply/exhaust port 60a, the thrust force is applied to the pushing piston 63 by the fluid supplied into the pressure chamber 65, whereby the pusher 51 moves forward up to the removal position. Accordingly, the panel material W is pushed out up to a small-diameter tip portion of the locating pin 13, thereby being conveyed to the next step by a conveying device (not shown).

As shown in FTG. 8C, when the fluid is supplied to the pressure chamber 66 from the supply/exhaust port 60a, the pusher 51 is forcibly driven up to the retreat limit position.

This positioning and clamping apparatus has been explained about the case of being mounted on the welding stage as described above, but may be mounted on not only the welding stage but also a robot arm, a conveying truck, and the like.

The present invention is not limited to the above embodiments, and may be variously modified and altered within a scope of not departing from the gist thereof. For example, although the locating pin 13 is provided with one clamp arm 22, two locating pins 13 may be provided as disclosed in Patent Document 1. In that case, since clamp arms through the slit 21 come out from both sides of the locating pin 13, the clamp arm is required to be provided with two pushing bar members, each of which is displaced an angle of 90° in phase from the clamp arm, in order to avoid interfering with the claim arm. Although the pusher 51 is provided with three pushing bar members 51a to 51c, it may have only any one of them. Also, although the clamp cylinder 32 is formed by a part of the base block 10 and the cylinder 31 attached thereto, the clamp cylinder 32 may be formed only by the base block which is formed integrally with the cylinder 31. Likewise, the pushing cylinder 61 may be formed integrally with the base block 10. Further, although the pusher 51 and the drive member 53 are independent from each other, the drive member 53 may be formed integrally with the pusher 51.

What is claimed is:
1. A positioning and clamping apparatus comprising:
a locating pin provided on a base having a contact surface contacting with a panel material, and protruding from the contact surface to penetrate through a through-hole formed in the panel material;
a clamp arm provided in a slit formed in the locating pin, and moving between an escaping position of entering into the slit and a clamping position where a clamp portion comes out from the slit and clamps the panel material along with the contact surface;
a reciprocating cam having a cam hole formed so as to contact with a drive pin fixed to a distal portion of the clamp arm, and moving, between the escaping position and the clamping position, the clamp arm via the drive pin;
a cam member fixed to the base so as to penetrate through an oscillating groove formed in the clamp arm, and causing the clamp arm to enter into the slit when the clamp arm reaches the escaping position and causing the clamp portion to come out from the slit when the clamp arm reaches the clamping position;

a pusher reciprocally incorporated into the base along the locating pin between a removal position of protruding from the contact surface to remove the panel material from the locating pin and a retreat limit position of entering into the contact surface;

cam drive means for driving the reciprocating cam between the escaping position and the clamping position; and pusher driving means for driving the pusher between the removal position and the retreat limit position.

2. The positioning and clamping apparatus according to claim 1, wherein the pusher driving means comprises: a pushing cylinder provided in the base; and a pushing piston reciprocally mounted in the pushing cylinder and linked to the reciprocating cam, fluid supplied to a pressure chamber partitioned and formed by the pushing cylinder and the pushing piston causing the pusher to be driven up to the removal position via the pushing piston.

3. The positioning and clamping apparatus according to claim 2, further comprising:

a spring member causing the pusher to come out at a waiting position located between the removal position and the escaping position; and a position detecting sensor for detecting a position of the pushing piston, wherein the position detecting sensor detects that the panel material contacts with the contact surface and that the pusher moves backward from the waiting position.

4. The positioning and clamping apparatus according to claim 1, wherein the cam driving means comprises: a clamp cylinder provided to the base; and a clamp piston reciprocally mounted in the clamp cylinder and driving the reciprocating cam, fluid supplied to the pressure chamber partitioned and formed by the clamp cylinder and the clamp piston causing the clamp arm to be driven up to the clamping position via the reciprocating cam.

5. The positioning and clamping apparatus according to claim 1, wherein the cam driving means comprises: an escaping cylinder provided to the base; and an escaping piston reciprocally mounted in the escaping cylinder and driving the clamp arm up to the escaping position via the reciprocating cam.

6. The positioning and clamping apparatus according to claim 4, wherein the cam driving means comprises a spring member mounted in a spring chamber provided to the base to drive the clamp arm up to the escaping position via the reciprocating cam.

* * * * *